United States Patent
Kline et al.

(10) Patent No.: US 10,691,066 B2
(45) Date of Patent: Jun. 23, 2020

(54) USER-DIRECTED HOLOGRAPHIC OBJECT DESIGN

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 456 days.

(21) Appl. No.: 15/477,258

(22) Filed: Apr. 3, 2017

(65) Prior Publication Data
US 2018/0284692 A1 Oct. 4, 2018

(51) Int. Cl.
*B33Y 50/00* (2015.01)
*G03H 1/00* (2006.01)
*B29C 64/386* (2017.01)

(52) U.S. Cl.
CPC ......... *G03H 1/0005* (2013.01); *B29C 64/386* (2017.08); *B33Y 50/00* (2014.12); *G03H 2001/0061* (2013.01); *G03H 2001/0088* (2013.01)

(58) Field of Classification Search
CPC ......... G03H 1/0005; G03H 2001/0061; G03H 2001/0088; B33Y 50/00; B29C 64/386
USPC .......................................................... 348/40
See application file for complete search history.

(56) References Cited

U.S. PATENT DOCUMENTS

| | | | |
|---|---|---|---|
| 2009/0076766 A1 | 3/2009 | Fein et al. | |
| 2011/0002020 A1 | 1/2011 | Khan | |
| 2011/0191707 A1 | 8/2011 | Lee et al. | |
| 2015/0213645 A1* | 7/2015 | Siebarth | G06T 19/00 345/420 |

(Continued)

OTHER PUBLICATIONS

Kurland, Kristen, "3D Tutorials AutoCAD 2007", found at https://www.andrew.cmu.edu/course/48-568/PDFs/AutoCAD3D_2007.pdf. (Year: 2007).*

(Continued)

*Primary Examiner* — William C Vaughn, Jr.
*Assistant Examiner* — Joseph Daniel A Towe
(74) *Attorney, Agent, or Firm* — Cantor Colburn LLP; Tihon Poltavets

(57) ABSTRACT

Systems, methods, and computer-readable media are disclosed for generating or modifying a holographic object based on user commands. Holographic projectors, which may be integrated with a user device, may be controlled to project a holographic grid that can be manipulated by a user to provide design commands to the user device. The user device may be configured to interpret the design commands and generate a holographic object based thereon. The holographic grid may include a plurality of cuboid cells. A user may, through gesture-based commands, indicate, for any given cell in the holographic grid, whether or not a portion of the holographic object should be generated in a three-dimensional spatial position corresponding to the cell. In addition, a user can provide gesture-based commands to selected cells of the holographic grid corresponding to portions of an existing holographic object that the user wishes to remove.

17 Claims, 8 Drawing Sheets

(56) References Cited

U.S. PATENT DOCUMENTS

2016/0147308 A1* 5/2016 Gelman ................ H04N 9/31
 345/156
2018/0173417 A1* 6/2018 Foresti ................ G06F 3/04886

OTHER PUBLICATIONS

3dprint [online]; [retrieved Jul. 14, 2016]; retrieved from the internet https://3dprint.com/111431/holovect-3d-projections/; Bridget Butler Millsaps, "The Holovect; Create & Code Your Own Special Holographic Effects via 3D Projections";Dec. 18, 2015, pp. 1-13.

Gizmag, [online]; [retrieved from the Internet Jul. 14, 2016]; http://www.gizmag.com/touchable-mid-air-holograms/40845/. John Anderson,"Mid-air holograms respond to human touch"; Dec. 9, 2015, pp. 1-6.

Gizmag, [online]; [retrieved from the internet Jul. 14, 2016]; http://www.gizmag.com/touchable-mid-air-holograms/40845/pictures?thumb=true#picture3. John Anderson,"Mid-air holograms respond to human touch"; Dec. 9, 2015, pp. 1-5.

* cited by examiner

USER-DIRECTED HOLOGRAPHIC OBJECT DESIGN

BACKGROUND

A hologram may be a photographic recording of a light field and may be used to display a fully three-dimensional image of an object. A hologram may be seen without the aid of special glasses or other intermediate optics. More specifically, a hologram may be an encoding of a light field as an interference pattern of variations in opacity, density, or surface profile of a medium (e.g., air, a holographic film, etc.). When suitably lit, the interference pattern diffracts the light into a reproduction of the original light field, and objects present in the original light field appear to be present in the reproduction, exhibiting visual depth cues such as parallax and perspective that change realistically with a change in the relative position of an observer.

SUMMARY

In one or more example embodiments of the disclosure, a method for generating a holographic object based on user commands is disclosed. The method includes controlling a first set of one or more holographic projectors to cause the first set of one or more projectors to project a holographic grid, and detecting user input indicative of one or more design operations corresponding to one or more cells of the holographic grid. The method further includes generating the holographic object based at least in part on the user input, and controlling a second set of one or more holographic projectors to cause the second set of one or more holographic projectors to project the holographic object.

In one or more other example embodiments of the disclosure, system for generating a holographic object based on user commands is disclosed. The system includes at least one memory storing computer-executable instructions and at least one processor configured to access the at least one memory and execute the computer-executable instructions to perform a set of operations. The operations include controlling a first set of one or more holographic projectors to cause the first set of one or more projectors to project a holographic grid, and detecting user input indicative of one or more design operations corresponding to one or more cells of the holographic grid. The operations further include generating the holographic object based at least in part on the user input, and controlling a second set of one or more holographic projectors to cause the second set of one or more holographic projectors to project the holographic object.

In one or more other example embodiments of the disclosure, a computer program product for generating a holographic object based on user commands is disclosed that includes a non-transitory storage medium readable by a processing circuit, the storage medium storing instructions executable by the processing circuit to cause a method to be performed. The method includes controlling a first set of one or more holographic projectors to cause the first set of one or more projectors to project a holographic grid, and detecting user input indicative of one or more design operations corresponding to one or more cells of the holographic grid. The method further includes generating the holographic object based at least in part on the user input, and controlling a second set of one or more holographic projectors to cause the second set of one or more holographic projectors to project the holographic object.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the disclosure include, among other things, systems, methods, computer-readable media, techniques, and methodologies for generating a holographic object based on user commands. In example embodiments of the disclosure, holographic projectors may be controlled to project a three-dimensional (3D) holographic grid that can be manipulated by a user to provide design commands to a user device. The user device may be configured to interpret the design commands and generate a holographic object based thereon. The holographic projectors may be integrated with the user device or may be externally provided and communicatively coupled to the device. The holographic grid may have a cuboid shape and may include a plurality of constituent cuboid cells. A user may, through gesture-based commands, indicate, for any given cell in the holographic grid, whether or not a portion of the holographic object should be generated in a three-dimensional spatial position corresponding to the cell.

In addition, example embodiments of the disclosure also include, among other things, systems, methods, computer-readable media, techniques, and methodologies for modifying an existing holographic object. A first set of one or more holographic projectors may be controlled to project a holographic object. A second set of one or more holographic projectors may then be controlled to project a holographic grid around the holographic object. A user may provide user input to a user device via the holographic grid in the form of gesture-based commands. More specifically, a user can provide gesture-based commands to selected cells of the holographic grid corresponding to portions of the holographic object that the user wishes to remove. The gesture-based commands may be interpreted by the user device to cause portions of the holographic object at spatial positions corresponding to the selected cells of the holographic grid to be removed. This may result in a modified holographic object having a hollow region corresponding to the portions of the original holographic object that were removed and a solid region.

Figure 1A:
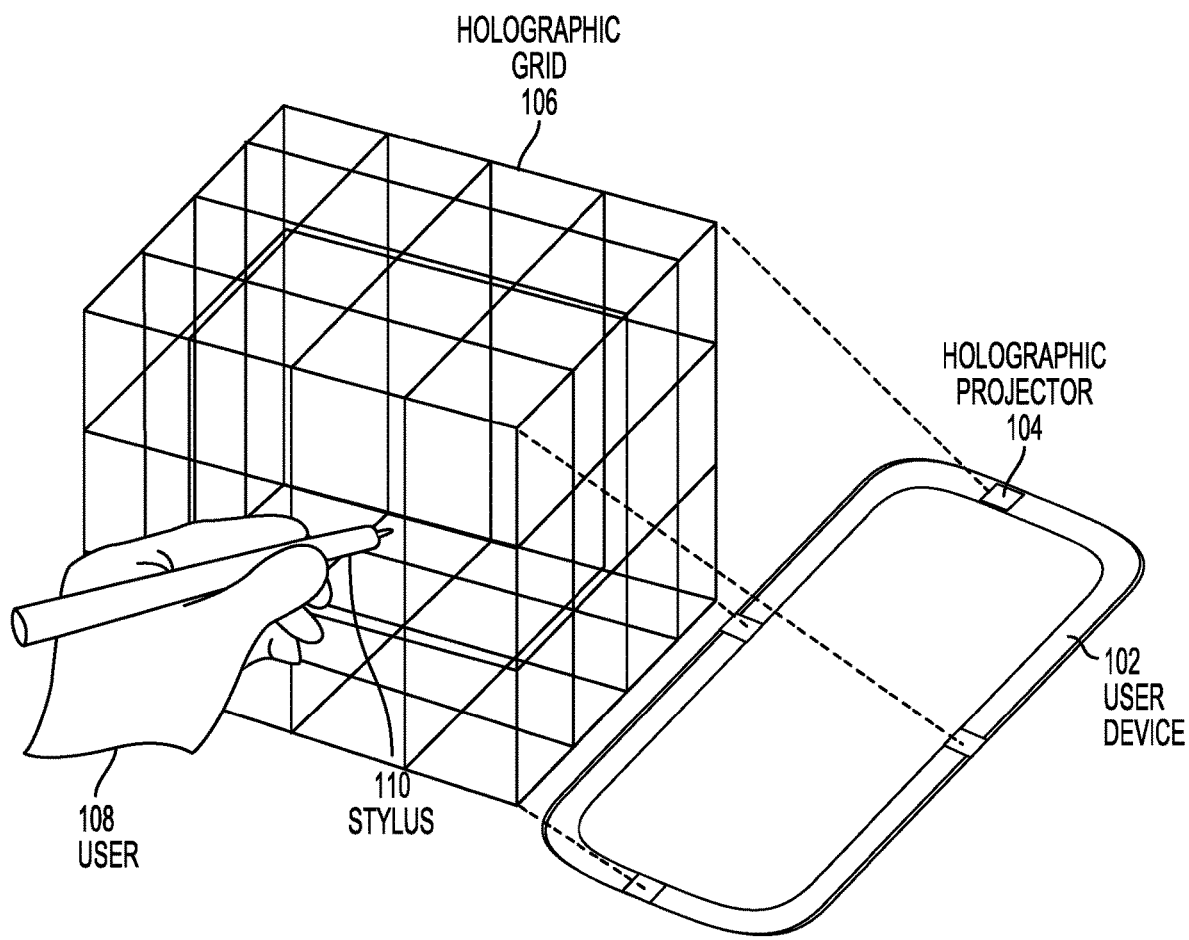
FIGS. 1A and 1B are schematic diagrams illustrating the generation of a holographic object based on user commands in accordance with one or more example embodiments of the disclosure.
Figure 1B:
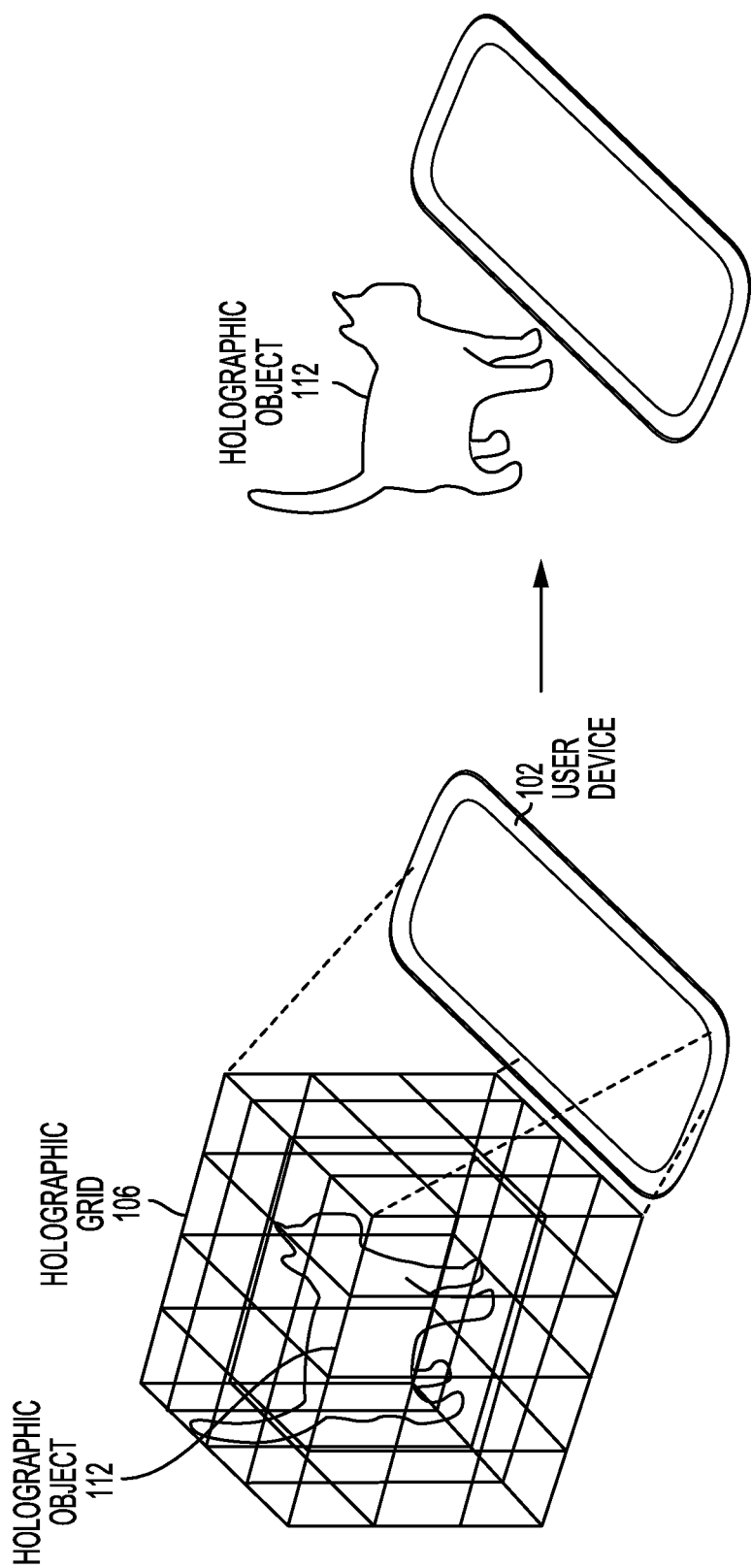
Figure 1C:
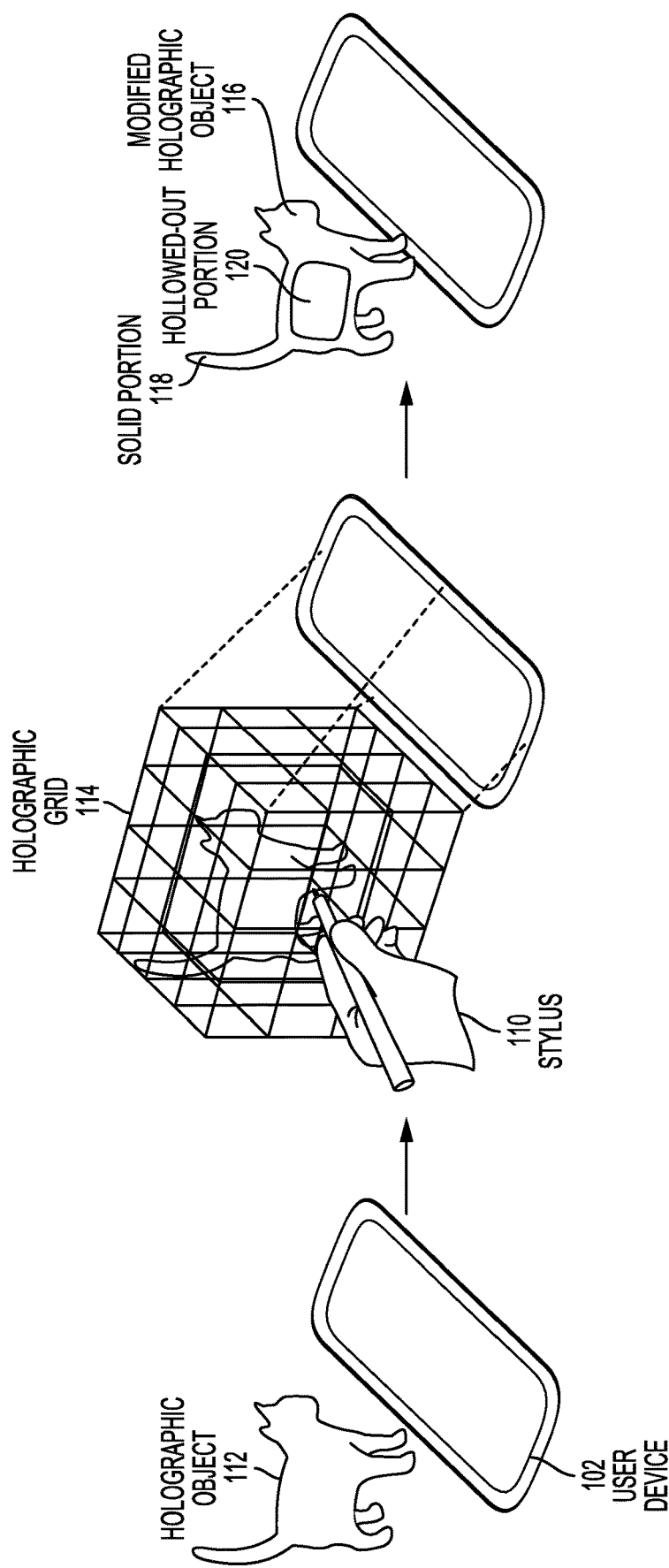
FIG. 1C is a schematic diagram illustrating a modification of a holographic object based on user commands in accordance with example embodiments of the disclosure.
Figure 2A:
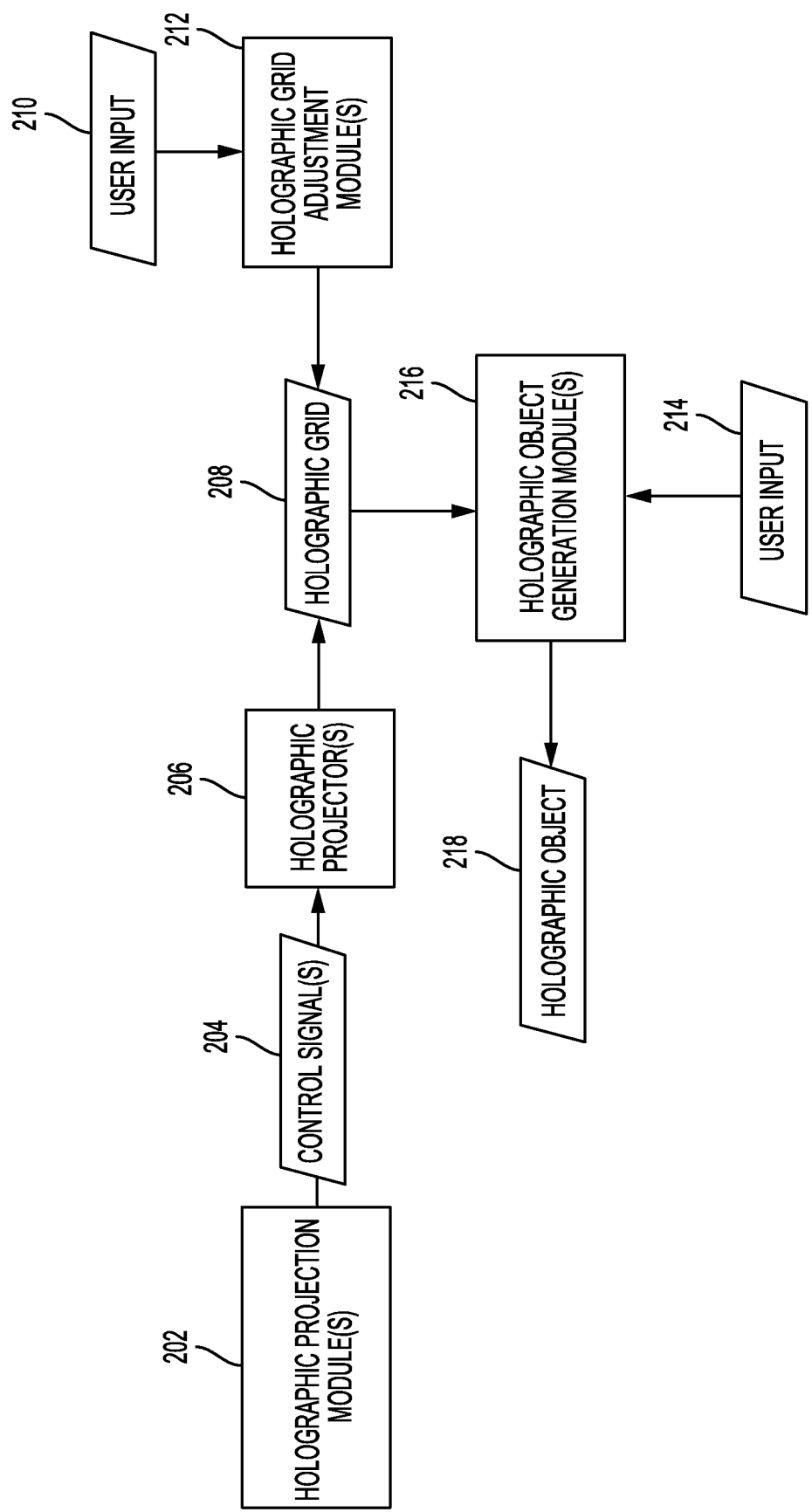
FIG. 2A is a schematic block diagram illustrating example components configured to generate a holographic object based on user commands in accordance with one or more example embodiments of the disclosure.
Figure 2B:
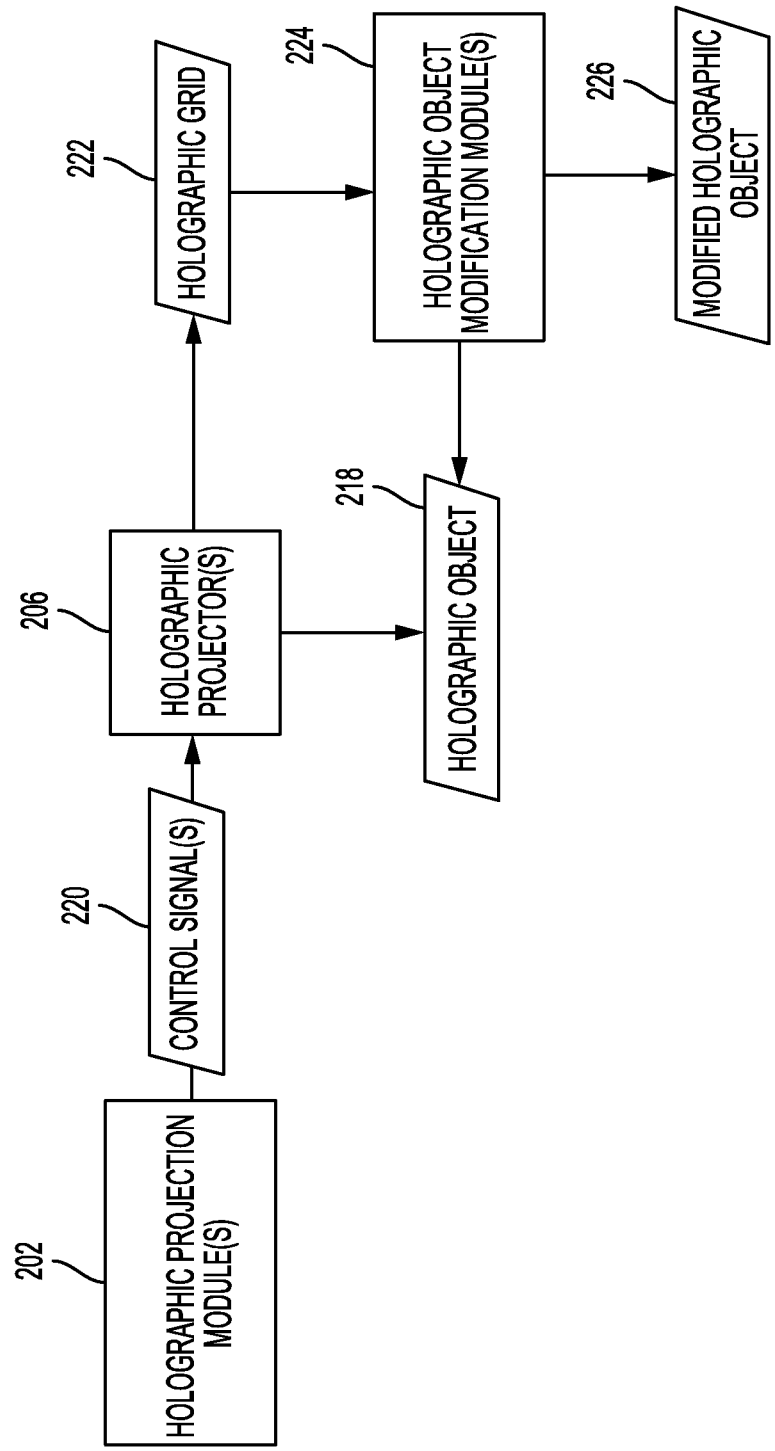
FIG. 2B is a schematic block diagram illustrating example components configured to modify a holographic object based on user commands in accordance with example embodiments of the disclosure.
Figure 3:
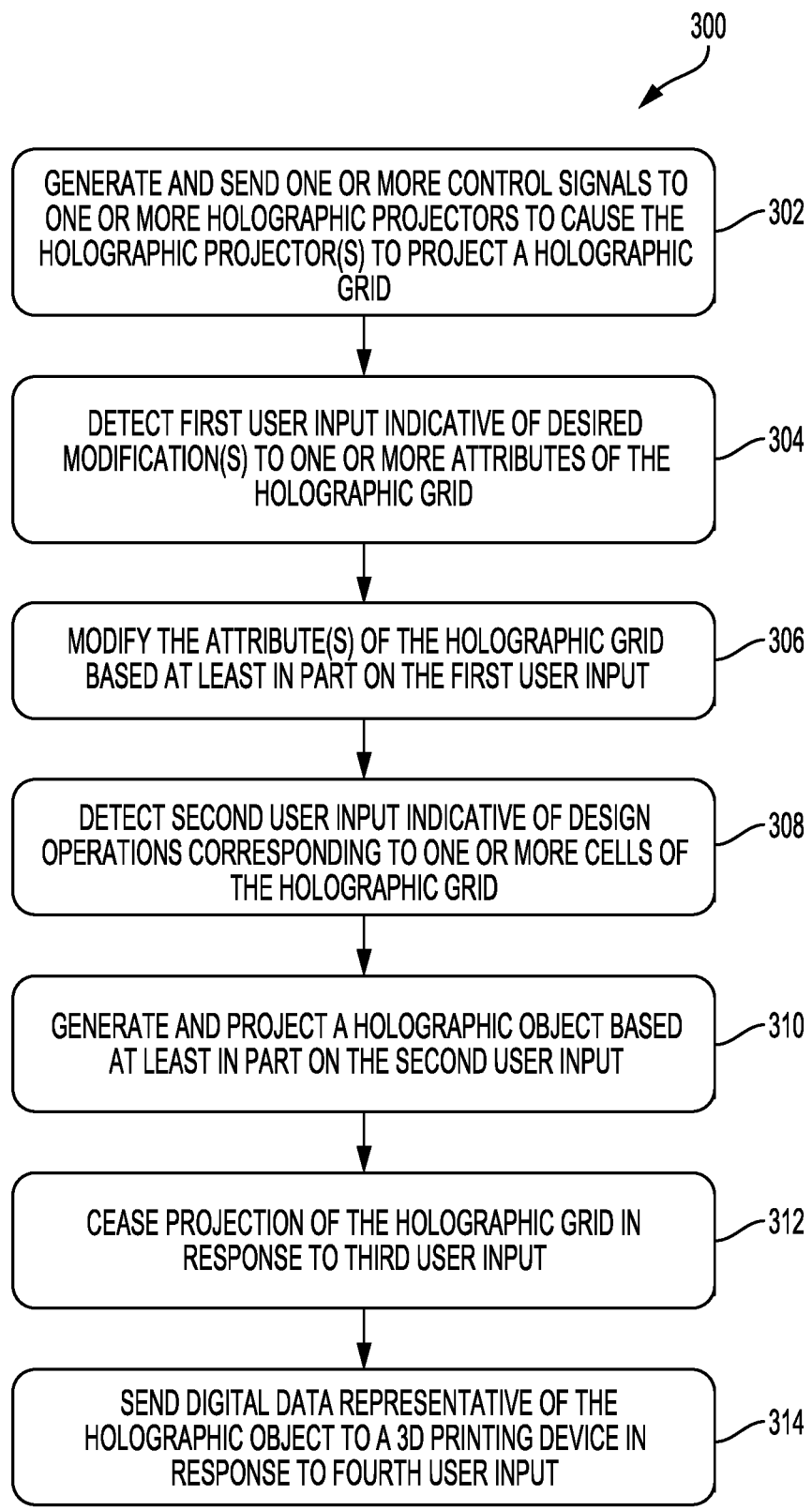
FIG. 3 is a process flow diagram of an illustrative method for generating a holographic object based on user commands in accordance with one or more example embodiments of the disclosure.
Figure 4:
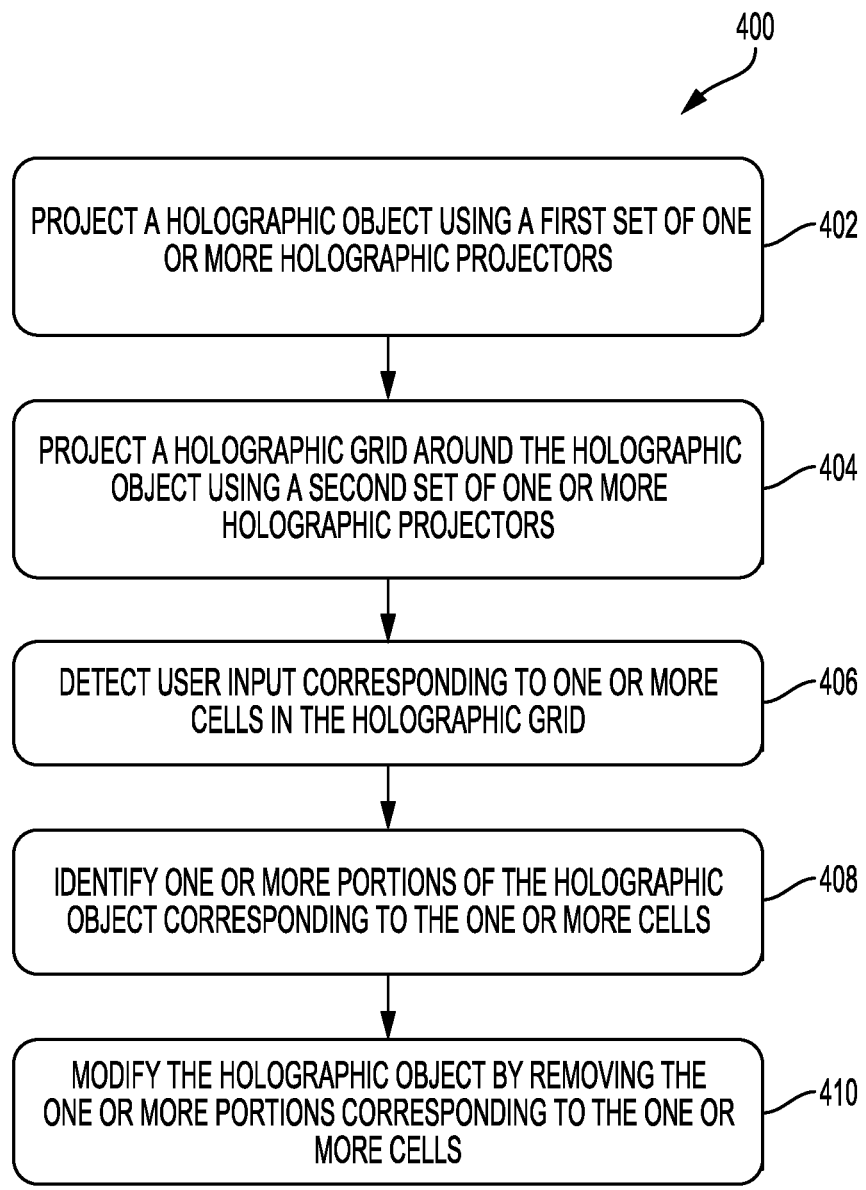
FIG. 4 is a process flow diagram of an illustrative method for modifying a holographic object based on user commands in accordance with one or more example embodiments of the disclosure.

FIGS. 1A and 1B are schematic diagrams illustrating the generation of a holographic object based on user commands. FIG. 2A is a schematic block diagram illustrating example components configured to generate a holographic object based on user commands. FIG. 3 is a process flow diagram of an illustrative method 300 for generating a holographic object based on user commands. In addition, FIG. 1C is a schematic diagram illustrating a modification of a holographic object based on user commands, FIG. 2B is a schematic block diagram illustrating example components configured to modify a holographic object based on user commands, and FIG. 4 is a process flow diagram of an illustrative method 400 for modifying a holographic object based on user commands. FIGS. 1A-1B, 2A, and 3 will be described hereinafter in conjunction with one another, and FIGS. 1C, 2B, and 4 will be described hereinafter in conjunction with one another.

Each operation of either of the methods 300 or 400 may be performed by one or more components that may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

FIG. 1A depicts an example user device 102. The user device 102 may be a smartphone, a tablet, a personal digital assistant, a personal computer, an electronic reader, or any other suitable electronic device capable of displaying digital content. The user device 102 may include a display, which may be a liquid-crystal display (LCD), a light-emitting diode (LED) display, an organic electroluminescent (OLED) display, or the like.

The user device 102 may include one or more holographic projectors 104 integrated with the device 102. While four holographic projectors 104 are depicted in FIG. 1A as being provided at example positions along a border of the user device 102, it should be appreciated that any number of holographic projectors 104 may be provided in accordance with any suitable arrangement. In addition, in certain example embodiments, some or all of the holographic projectors 104 may be provided externally within an environment or ecosystem in which the user device 102 is located. In such example embodiments, holographic projectors provided within the environment may be communicatively coupled to the user device 102 via one or more networks to allow the user device 102 to send control signals to such holographic projectors to control their operation.

Referring now to FIGS. 1A, 2A, and 3 in conjunction with one another, at block 302 of the method 300, computer-executable instructions of one or more holographic projection modules 202 may be executed to cause one or more control signals 204 to be generated and sent to the holographic projectors 206 to cause the holographic projectors 206 to project a holographic grid 208. The holographic grid 208 may be the example holographic grid 106 depicted in FIG. 1A, and the holographic projectors 206 may include any number of the example holographic projectors 104 depicted in FIG. 1A, which may be integrated with the user device 102 in any suitable arrangement and/or provided externally within the ecosystem. The holographic grid 206 (e.g., the holographic grid 106) may be projected into mid-air in a region above or otherwise in relatively close proximity to a user device (e.g., the user device 102). In other example embodiments, the holographic grid 208 may be projected into or onto a holographic medium provided in the ecosystem or integrated with the device. In certain example embodiments, the holographic grid 208 may be a 3D grid containing a plurality of cuboid cells, as shown with the example holographic grid 106. Each cell may be the same size and shape. Alternatively, two or more cells may be of different sizes and/or shapes.

At block 304 of the method 300, computer-executable instructions of one or more holographic grid adjustment modules 212 may receive first user input 210 from a user (e.g., user 108 shown in FIG. 1) indicative of desired modification(s) to one or more attributes of the holographic grid 208. At block 306 of the method 300, computer-executable instructions of the holographic grid adjustment module(s) 212 may be executed to modify the attribute(s) of the holographic grid 206 based on the first user input 210.

Referring to the example holographic grid 106 depicted in FIG. 1, the user 108 may make any of variety of modifications to attributes of the grid 106. For example, the grid 106 may initially be projected at a default size with a default number of cells. The default number of cells may be user-specified or automatically set by the user device 102. The user 108 may be provided with the capability to adjust the density of the grid 106. For example, the user 108 may be able to increase the density of the grid 106 to increase the number and granularity of its constituent cells or decrease the density of the grid 106 to decrease the number and granularity of its constituent cells. As another non-limiting example, the user 108 may be provided with the capability to scale the grid 106 by changing the relative size of the grid 106 along different axes. As yet another non-limiting example, the user 108 may be provided with the capability to translate the grid 106 linearly, rotate the grid 106 along any of its axes, distort the grid 106, or the like. As still another non-limiting example, the user 108 may be provided with the capability to extract a smaller region of the grid and perform manipulations on this child grid independently from manipulations performed on the parent grid. Manipulations that can be performed on the holographic grid 106 will be described in greater detail hereinafter, and may include, for example, gesture-based commands.

In certain example embodiments, the user 108 may specify values for various attributes of the holographic grid 106 via a user interface presented on a display of the user device 102, for example. For instance, the user 108 may specify a grid size value that indicates a desired size of the holographic grid 106 (e.g., the number of cells to include in the grid 106); a cell size value that indicates the size of each constituent cell of the grid 106 (e.g., the dimensions of each cell); a cell shape (e.g., cuboid, rectangular solid, etc.); a grid scale value that indicates a scaling factor to be applied to the holographic grid 106; and so forth.

In other example embodiments, the user 108 may modify attributes of the holographic grid 106 through gestures. Gestures by the user 108 may be detected by the user device 102 and interpreted to cause corresponding attributes of the grid 106 to be modified. For example, one or more cameras integrated with the user device 102 or provided externally within the environment may capture gestures by the user 108, which may be analyzed by gesture detection software executing on the user device 102 (or on a remote server) to determine corresponding attributes to which the gestures relate and the degree to which those attributes should be modified. In other example embodiments, in addition to or as an alternative to hand gestures detected using cameras, the user 108 may utilize a device (e.g., a stylus, a glove with sensors affixed thereto, etc.) to provide user commands indicative of desired modifications to attributes of the grid 106.

Example types of gestures may include, for example, pinch gestures that the user 108 may perform in midair in order to adjust the density of the holographic grid 106 and/or the scale of the grid 106. Such midair pinch gestures may be similar to those performed to zoom in and out on a touchscreen display. As another non-limiting example, the user 108 may trace the boundary of a sub-region of the grid 106 to indicate to the user device 102 that the user 108 wishes to manipulate the sub-region independently of the original grid 106.

Referring again to FIGS. 2A and 3, at block 308 of the method 300, computer-executable instructions of one or more holographic object generation modules 216 may be executed to detect second user input 214 indicative of design operations corresponding to one or more cells of the holographic grid 208. Then, at block 310 of the method 300, computer-executable instructions of the holographic object generation module(s) 216 may be executed to generate a holographic object 218, which may then be projected using the holographic projector(s) 206. In certain example embodiments, a first set of one or more of the holographic projectors 206 may be used to project the holographic grid 208 while a second set of one or more of the holographic projectors 206 may be used to project the holographic object 218. The first set of holographic projectors and the second set of holographic projectors may include one or more common holographic projectors.

Referring again to FIG. 1A and the example holographic grid 106, in certain example embodiments, the user 108 may utilize a device such as a stylus 110 to provide commands to the user device 102 indicative of desired design operations to be performed with respect to cells of the grid 106. For example, the user 108 may insert a tip of the stylus 110 into a cell of the grid 106 to indicate that that the user 108 wishes to fill in the cell, or in other words, generate a portion of a holographic object at a spatial position corresponding to the cell. In certain example embodiments, the cells of the grid 106 that are selected for filling in may be those that the user 108 traverses with the stylus 110. Cameras or other sensors integrated with the user device 102 or provided externally in an environment in which the user device 102 is located may detect a position of the stylus 110 within the holographic grid 106 and determine which cells have been traversed, and thus, determine which cells are to be filled in.

FIG. 1B depicts an example holographic object 112 that may be generated based on user design commands. Solid portions of the holographic object 112 may correspond to those cells of the grid 106 that were filled in based on the user commands received from the stylus 110. Further, in various example embodiments, various operations may be performed on the rendered holographic object 112. For example, the holographic object may be rotatable and scalable in three dimensions.

In certain example embodiments, the stylus 110 or other device utilized by the user 108 to provide design commands, may include a control button, switch, or the like that allows the user 108 to switch between two or more design states. For example, the user 108 may be able to switch between an "active" state in which cells traversed by the stylus 110 are filled in and an "inactive" state in which cells traversed by the stylus 110 are not filled in. In this manner, the user 108 may be able to fine-tune the design of the holographic object 112 by switching between active and inactive states along the path traversed by the stylus 110. For example, a discontiguous holographic object may be generated by switching between active and inactive states as the stylus 110 traversed through the holographic grid 106.

In other example embodiments, the stylus 110 may include a slide control mechanism or the like that allows a user 108 to issue design commands based on the direction in which the user 108 slides her finger along the stylus 110. For example, a slide gesture towards the tip of the stylus 110 may be indicative of command to fill in a cell while a slide gesture away from the tip of the stylus 110 may be indicative of a command to make a cell empty (e.g., not from any portion of the holographic object 112 at a spatial position corresponding to the cell).

It should be appreciated that a cell that was previously filled in based on a design command may be made empty based on a subsequent design command. For example, the user 108 may utilize the control button or switch described above to switch to the inactive state while the stylus 110 is placed in a cell that has been filled in, thereby causing the cell to instead be made empty. Alternatively, the user 108 may perform a suitable slide gesture, as described above, to convert a cell that has been filled-in into an empty cell.

In certain example embodiments, rather than a stylus 110, the user 108 may utilize a glove or other wearable apparatus having sensors affixed thereto. As the user traverses the wearable apparatus through the cells of the grid 106, the sensors may generate sensor data that may be processed by the user device 102 to determine which cells were traversed, and thus, which cells to fill in to form the holographic object 112. For example, the sensor data may include spatial location data that identifies a position of the wearable apparatus in relation to a reference point (e.g., a center of the holographic grid 106). The holographic object generation module(s) 216 may then map the spatial location data to cell positions within the grid 106 to determine which cells were traversed by the wearable apparatus.

In certain example embodiments, the user 108 may first select cells of the holographic grid 106 that correspond to desired portions of the holographic object 112 using the stylus 110, for example. The user 108 may then select one or more design operations to perform on the selected cells. As previously noted, a design operation may include filling in a selected cell to cause a portion of the holographic object 112 to be generated at a spatial position corresponding to the selected cell. In certain example embodiments, other design operations beyond filling in a cell may also be specified. For example, any of a variety of cell attributes may be specified or adjusted including, but not limited to, line weight; line color; fill color; transparency; color/shading gradients; and so forth. In certain example embodiments, design commands that specify or modify cell attributes may be issued by providing input directly to the user device 102 such as, for example, through touch-based interactions with a display of the user device 102. In other example embodiments, the user 108 may specify a design operation using the stylus 110 by, for example, placing a tip of the stylus 110 on or in a holographic control field such as a holographic button, slide bar, or the like. Further, in certain example embodiments, the user 108 may first specify one or more design commands and then select the cell(s) to which the design commands are applicable.

In certain example embodiments, the holographic object 112 may be interactively rendered and projected as design operations are performed by the user 108. For example, the filling of a cell of the holographic grid 106 and/or a filled-in cell being made empty may be rendered in real-time or near real-time as the corresponding design operations are being performed. This may provide the user 108 with an animated and visually appealing indication of how the design operations are impacting the holographic object 112 that is being generated.

Once generated, the holographic object 218 (e.g., the example holographic object 112) may be stored in volatile and/or non-volatile memory. In those example embodiments in which an existing holographic object is being modified in some fashion (which will be described in greater detail later in this disclosure with reference to FIG. 4), the user device 102 may store a rendering file indicative of the modifications to the holographic object. The rendering file may be stored in association with a model file representative of the original holographic object such that the rendering file is additively superimposed on the model file when the modified holographic object is rendered. The modified holographic object may additionally, or alternatively, be stored as a rendering layer jointly with the model file.

Referring again to FIGS. 1B and 3, at block 312 of the method 300, computer-executable instructions of the holographic projection module(s) 202 may be executed to cease projection of the holographic grid 208 in response to receipt of third user input. For example, the user 108 may provide input to the user device 102 to cause the holographic projection module(s) 202 to control the holographic projectors 104 to cease projection of the holographic grid 106 as shown in FIG. 1B such that only the holographic object 112 is projected. The third user input may be provided using the stylus 110 or by providing touchscreen input or the like to the user device 102.

In certain example embodiments, the user 108 may wish to have a physical 3D object printed from the holographic object 112. As such, at block 314 of the method 300, the user device 102 may send digital data representative of the holographic object 112 (e.g., a rendering file and model file) to a 3D printing device configured to print a 3D object that reflects the holographic object 112 based on the representative digital data. In certain example embodiments, characteristics of the 3D printed object may be controlled based on the characteristics of the holographic object 112. As an example, a density of the 3D printed object may be controlled based on a density of the holographic object 112. For instance, if the holographic object 112 has a low luminous density, the 3D printed object may correspondingly have a low physical density (e.g., may be more porous).

Referring now to FIGS. 1C, 2B, and 4 in conjunction with one another, a method 400 for modifying an existing holographic object will be described hereinafter. While the method 400 describes a particular example type of modification in which a portion of a holographic object is hollowed-out, it should be appreciated that any of a variety of modifications may be made to a holographic object. For example, additional cells of a holographic grid may be filled-in to add additional portions to a holographic object. As another non-limiting example, other cell attributes may be modified such as color, line weight, transparency, or the like. As yet another non-limiting example, a holographic object may be rotated, scaled, distorted, or otherwise manipulated in three dimensions.

At block 402 of the method 400, computer-executable instructions of the holographic projection module(s) 202 may be executed to cause a first set of the holographic projectors 206 to project the holographic object 218. More specifically, computer-executable instructions of the holographic projection module(s) 202 may be executed to generate and send one or more control signals 220 to the first set of holographic projectors 206 to cause the first set of holographic projectors 206 to project the holographic object 218. The control signal(s) 220 may be generated based on stored data representative of the holographic object 218 and may indicate which holographic projectors 206 should be controlled to project the holographic object 218 and the manner in which they are to be controlled. The holographic object 218 that is projected may be the example holographic object 112 depicted in FIGS. 1A-1C.

At block 404 of the method 400, computer-executable instructions of the holographic projection module(s) 202 may be executed to cause a second set of the holographic projectors 206 to project a holographic grid 222 around the holographic object 218. More specifically, computer-executable instructions of the holographic projection module(s) 202 may be executed to generate and send one or more control signals to the second set of holographic projectors 206 to cause the second set of holographic projectors 206 to project the holographic grid 222. The holographic grid 222 may be the example holographic grid 114 depicted in FIG. 1C.

At block 406 of the method 400, computer-executable instructions of one or more holographic object modification modules 224 may be executed to detect user input corresponding to one or more cells of the holographic grid 222. At block 408 of the method 400, computer-executable instructions of the holographic object modification module(s) 224 may be executed to identify one or more portions of the holographic object 218 that correspond to the cell(s) of the holographic grid 222 that received user input. Then, at block 410 of the method 400, computer-executable instructions of the holographic object modification module(s) 224 may be executed to remove the one or more portions corresponding to the cell(s) from the original holographic object 218 to obtain a modified holographic object 226.

Referring illustratively to FIG. 1C, the holographic object modification module(s) 224 may detect, at block 406 of the method 400, user input provided by the user 108 to the holographic grid 114 using the stylus 110, a wearable apparatus, hand or finger gestures, or the like. For example, as previously described, the user 108 may select a control button or switch on the stylus 110 or perform a slide gesture on a surface of the stylus 110 to issue a design command to make a filled-in cell of the holographic grid 114 empty. In this manner, a solid portion of the holographic object 112 that corresponds to the filled-in cell may be removed (e.g., hollowed-out) in response to the design command to make the cell empty. Gestures or movements of the user 108 using the stylus 110, a wearable apparatus, or the user's hands/fingers alone may be detected using cameras or other sensors integrated with the user device 102 or provided externally in an environment in which the user device 102 is located. Once the one or more portions of the holographic object 112 are removed at block 410 of the method 400, the projection of the holographic grid 114 may be ceased such that a modified holographic object 116 is alone projected. As illustratively depicted in FIG. 1C, the modified holographic object 116 may include a solid portion 118 and a hollowed-out portion 120.

In certain example embodiments, the holographic object 112 may be capable of being oriented in multiple different views to facilitate identification of cells of the holographic grid 114 to which user input is to be provided to cause the removal of corresponding portions of the holographic object 112. Further, in certain example embodiments, once a hollowing-out operation is completed, a native outer surface of the holographic object 112 that was removed to gain access to internal portions of the holographic object 112 for removal may be regenerated. In addition, as described earlier in connection with the generation of the holographic object 112, the modified holographic object 116 may be stored and digital data representative of the modified holographic object 116 may be sent to a 3D printer to print a physical 3D model of the modified holographic object 116. Hollow or solid 3D objects can be printed with multiple materials at variable thicknesses. For example, a 3D printed globe may include a magnetic-metallic or gelatinous core representing the Earth's core and a solid crystalline outer surface representing the Earth's outer surface.

Example embodiments of the disclosure provide various technical features, technical effects, and/or improvements to technology. For instance, example embodiments of the disclosure provide the technical effect of generating a holographic object or modifying an existing holographic object in response to user input indicative of gesture-based design commands. This technical effect is achieved at least in part by the technical features of projecting a holographic grid and providing a user with the capability to traverse cells of the holographic grid and provide design commands to a user device using a stylus, a wearable apparatus, or hand/finger gestures alone to cause the user device to generate or modify a corresponding holographic object. These technical features result in the improvement of the functioning of a computer with respect to holographic object creation/modification.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 5:
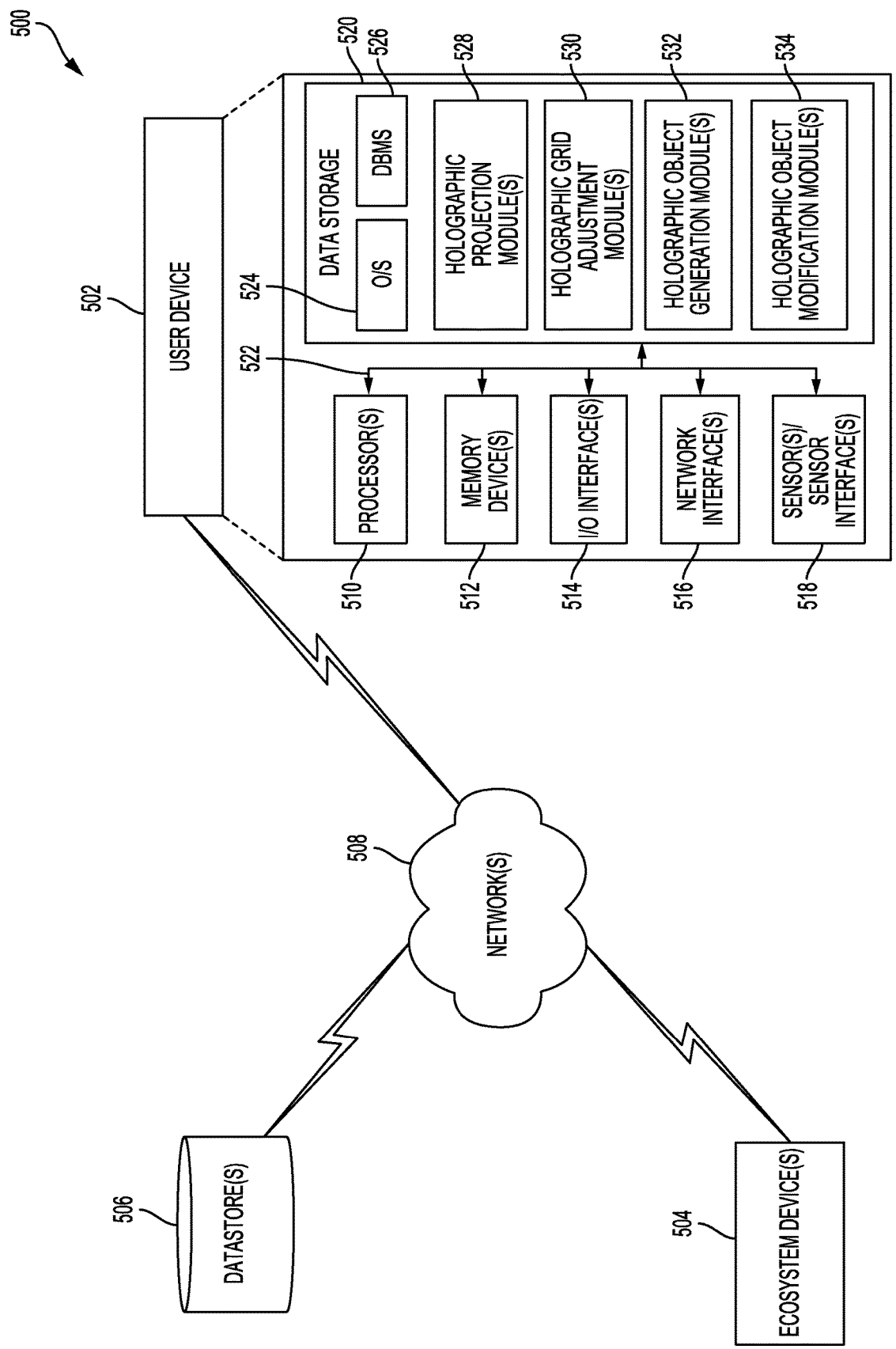
FIG. 5 is a schematic diagram of an illustrative networked architecture configured to implement one or more example embodiments of the disclosure.

FIG. 5 is a schematic diagram of an illustrative networked architecture 500 configured to implement one or more example embodiments of the disclosure. The illustrative architecture 500 may include an example user device 502 and one or more ecosystem devices 504. The example user device 502 may represent an illustrative configuration of the user device 102. The ecosystem device(s) 504 may include one or more devices configured to implement any of the functionality described herein (including functionality illustratively described in connection with the user device 102). The ecosystem device(s) 504 may additionally, or alternatively, include any number of holographic projectors provided within an ecosystem/environment.

The user device 502 may be configured to communicate with the ecosystem device(s) 504 and/or one or more data store(s) 506 over one or more networks 508. The network(s) 508 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 508 may have any suitable communication range associated therewith and may include, for example, global networks (e.g., the Internet), metropolitan area networks (MANs), wide area networks (WANs), local area networks (LANs), or personal area networks (PANs). In addition, the network(s) 508 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the user device 502 may include one or more processors 510, one or more memory devices 512 (generically referred to herein as memory 512), one or more input/output ("I/O") interface(s) 514, one or more network interfaces 516, one or more sensors/sensor interfaces 518, and data storage 520. The user device 502 may further include one or more buses 522 that functionally couple various components of the device 502.

The bus(es) 522 may include at least one of a system bus, a memory bus, an address bus, or a message bus, and may permit the exchange of information (e.g., data (including computer-executable code), signaling, etc.) between various components of the user device 502. The bus(es) 522 may include, without limitation, a memory bus or a memory controller, a peripheral bus, an accelerated graphics port, and so forth. The bus(es) 522 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 512 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 512 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 512 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 520 may include removable storage and/or non-removable storage including, but not limited to, magnetic storage, optical disk storage, and/or tape storage. The data storage 520 may provide non-volatile storage of computer-executable instructions and other data. The memory 512 and the data storage 520, removable and/or non-removable, are examples of computer-readable storage media (CRSM) as that term is used herein.

The data storage 520 may store computer-executable code, instructions, or the like that may be loadable into the memory 512 and executable by the processor(s) 510 to cause the processor(s) 510 to perform or initiate various operations. The data storage 520 may additionally store data that may be copied to memory 512 for use by the processor(s) 510 during the execution of the computer-executable instructions. Moreover, output data generated as a result of execution of the computer-executable instructions by the processor(s) 510 may be stored initially in memory 512 and may ultimately be copied to data storage 520 for non-volatile storage.

More specifically, the data storage 520 may store one or more operating systems (O/S) 524; one or more database management systems (DBMS) 526 configured to access the memory 512 and/or the external data store(s) 506; and one or more program modules, applications, engines, computer-executable code, scripts, or the like such as, for example, one or more holographic projection modules 528, one or more holographic grid adjustment modules 530, one or more holographic object generation modules 532, and one or more holographic object modification modules 534. Any of the components depicted as being stored in data storage 520 may include any combination of software, firmware, and/or hardware. The software and/or firmware may include computer-executable instructions (e.g., computer-executable program code) that may be loaded into the memory 512 for execution by one or more of the processor(s) 510 to perform any of the operations described earlier in connection with similarly named program modules. While the user device 502 is illustratively shown as containing program modules configured to implement any of the example embodiments described herein, it should be appreciated that some program modules may not be present in certain example embodiments.

Although not depicted in FIG. 5, the data storage 520 may further store various types of data utilized by components of the user device 502 (e.g., content metadata indicating whether the content is confidential; user settings; holographic image data; holographic opacity/transparency settings; spatial attribute data; transition path data; etc.). Any data stored in the data storage 520 may be loaded into the memory 512 for use by the processor(s) 510 in executing computer-executable instructions. In addition, any data stored in the data storage 520 may potentially be stored in the external data store(s) 506 and may be accessed via the DBMS 524 and loaded in the memory 512 for use by the processor(s) 510 in executing computer-executable instructions.

The processor(s) 510 may be configured to access the memory 512 and execute computer-executable instructions loaded therein. For example, the processor(s) 510 may be configured to execute computer-executable instructions of the various program modules, applications, engines, or the like of the user device 502 to cause or facilitate various operations to be performed in accordance with one or more embodiments of the disclosure. The processor(s) 510 may include any suitable processing unit capable of accepting data as input, processing the input data in accordance with stored computer-executable instructions, and generating output data. The processor(s) 510 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 510 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 510 may be capable of supporting any of a variety of instruction sets.

Referring now to other illustrative components depicted as being stored in the data storage 520, the O/S 524 may be loaded from the data storage 520 into the memory 512 and may provide an interface between other application software executing on the user device 502 and hardware resources of the user device 502. More specifically, the O/S 524 may include a set of computer-executable instructions for managing hardware resources of the user device 502 and for providing common services to other application programs. In certain example embodiments, the O/S 524 may include or otherwise control execution of one or more of the program modules depicted as being stored in the data storage 520. The O/S 524 may include any operating system now known or which may be developed in the future including, but not limited to, any server operating system, any mainframe operating system, or any other proprietary or non-proprietary operating system.

The DBMS 526 may be loaded into the memory 512 and may support functionality for accessing, retrieving, storing, and/or manipulating data stored in the memory 512, data stored in the data storage 520, and/or data stored in the external data store(s) 506. The DBMS 526 may use any of a variety of database models (e.g., relational model, object model, etc.) and may support any of a variety of query languages. The DBMS 526 may access data represented in one or more data schemas and stored in any suitable data repository. The external data store(s) 506 that may be accessible by the user device 502 via the DBMS 526 may include, but are not limited to, databases (e.g., relational, object-oriented, etc.), file systems, flat files, distributed data stores in which data is stored on more than one node of a computer network, peer-to-peer network data stores, or the like. In certain example embodiments, the DBMS 526 may be a lightweight DBMS designed for a mobile device.

Referring now to other illustrative components of the user device 502, the input/output (I/O) interface(s) 514 may facilitate the receipt of input information by the user device 502 from one or more I/O devices as well as the output of information from the user device 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the user device 502 or may be separate. The I/O devices may further include, for example, any number of peripheral devices such as data storage devices, printing devices, and so forth.

The I/O interface(s) 514 may also include an interface for an external peripheral device connection such as universal serial bus (USB), FireWire, Thunderbolt, Ethernet port or other connection protocol that may connect to one or more networks. The I/O interface(s) 514 may also include a connection to one or more antennas to connect to one or more of the network(s) 506 via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The user device 502 may further include one or more network interfaces 516 via which the user device 502 may communicate with any of a variety of other systems, platforms, networks, devices, and so forth. The network interface(s) 516 may enable communication, for example, with the ecosystem device(s) 504 and/or the data store(s) 506 via the network(s) 508.

The user device 502 may further include one or more sensors/sensor interfaces 518. The sensor(s)/sensor interface(s) 518 may include any suitable sensor or sensor interface such as, for example, a holographic projector, an accelerometer, a gyroscope, other types of inertial sensors, a camera, or the like.

It should be appreciated that the program modules depicted in FIG. 5 as being stored in the data storage 520 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the user device 502, hosted locally on an ecosystem device 504, and/or hosted on other user device(s) accessible via the network(s) 508, may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of servers in the user device 502 in accordance with any suitable computing model such as, for example, a client-server model, a peer-to-peer model, and so forth. In addition, any of the functionality described as being supported by any of the modules depicted in FIG. 5 may be implemented, at least partially, in hardware and/or firmware across any number of devices.

It should further be appreciated that the user device 502 and/or an ecosystem device 504 may include alternate and/or additional hardware, software, or firmware components beyond those described or depicted without departing from the scope of the disclosure. More particularly, it should be appreciated that software, firmware, or hardware components depicted as forming part of the user device 502 or an ecosystem device 504 are merely illustrative and that some components may not be present or additional components may be provided in various embodiments. While various illustrative modules have been depicted and described as software modules stored in data storage 520, it should be appreciated that functionality described as being supported by such modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 300 or 400 may be performed by a user device 502 having the illustrative configuration depicted in FIG. 5 and/or by an ecosystem device 504, or more specifically, by one or more program modules, engines, applications, or the like executing on such a system or device. It should be appreciated, however, that such operations may be implemented in connection with numerous other device configurations.

The operations described and depicted in the illustrative methods of FIGS. 3 and 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3 and 4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating a holographic object based on user commands, the method comprising:
   controlling a first set of one or more holographic projectors to cause the first set of one or more projectors to project a three-dimensional (3D) holographic grid;
   detecting user input indicative of one or more design operations corresponding to one or more cells of the 3D holographic grid;
   generating the holographic object based at least in part on the user input; and
   controlling a second set of one or more holographic projectors to cause the second set of one or more holographic projectors to project the holographic object,
   wherein the user input indicative of one or more design operations corresponding to one or more cells of the 3D holographic grid comprises a first gesture of a user indicative of a first design operation corresponding to a first cell of the 3D holographic grid and a second gesture of the user indicative of a second design operation corresponding to a second cell of the 3D holographic grid, and
   wherein generating the holographic object based at least in part on the user input comprises generating a first portion of the holographic object at a first spatial location corresponding to the first cell of the 3D holographic grid in response to the first gesture and refraining from generating any portion of the holographic object at a second spatial location corresponding to the second cell of the 3D holographic grid in response to the second gesture.

2. The computer-implemented method of claim 1, wherein the user input is first user input, the method further comprising:
   detecting second user input; and
   controlling the first set of one or more holographic projectors to cease projection of the 3D holographic grid in response to the second user input.

3. The computer-implemented method of claim 2, further comprising:
   detecting third user input; and
   sending digital data representative of the holographic object to a three-dimensional (3D) printing device to cause a 3D object of the holographic object to be printed in response to the third user input.

4. The computer-implemented method of claim 1, wherein the user input is first user input, the method further comprising:
   detecting second user input indicative of one or more desired modifications to one or more attributes of the 3D holographic grid; and
   modifying the one or more attributes of the 3D holographic grid based at least in part on the second user input,
   wherein the one or more attributes comprise at least one of a density of the 3D holographic grid or a scale of the 3D holographic grid.

5. The computer-implemented method of claim 1, wherein detecting the user input indicative of the one or more design operations comprises receiving sensor data from one or more sensors of a design object manipulated by a user.

6. The computer-implemented method of claim 1, wherein the user input is first user input, the method further comprising after generating the holographic object:
   detecting second user input corresponding to a subset of the one or more cells; and
   removing one or more portions of the holographic object corresponding to the subset of the one or more cells to obtain a modified holographic object comprising a solid region and a hollow region.

7. A system for generating a holographic object based on user commands, the system comprising:
   at least one memory storing computer-executable instructions; and
   at least one processor configured to access the at least one memory and execute the computer-executable instructions to:
      control a first set of one or more holographic projectors to cause the first set of one or more projectors to project a three-dimensional (3D) holographic grid;
      detect user input indicative of one or more design operations corresponding to one or more cells of the 3D holographic grid;
      generate the holographic object based at least in part on the user input; and
      control a second set of one or more holographic projectors to cause the second set of one or more holographic projectors to project the holographic object,
   wherein the user input indicative of one or more design operations corresponding to one or more cells of the 3D holographic grid comprises a first gesture of a user indicative of a first design operation corresponding to a first cell of the 3D holographic grid and a second gesture of the user indicative of a second design operation corresponding to a second cell of the 3D holographic grid, and
   wherein generating the holographic object based at least in part on the user input comprises generating a first portion of the holographic object at a first spatial location corresponding to the first cell of the 3D holographic grid in response to the first gesture and refraining from generating any portion of the holographic object at a second spatial location corresponding to the second cell of the 3D holographic grid in response to the second gesture.

8. The system of claim 7, wherein the user input is first user input, and wherein the at least one processor is further configured to execute the computer-executable instructions to:
   detect second user input; and
   control the first set of one or more holographic projectors to cease projection of the 3D holographic grid in response to the second user input.

9. The system of claim 8, wherein the at least one processor is further configured to execute the computer-executable instructions to:
   detect third user input; and
   send digital data representative of the holographic object to a three-dimensional (3D) printing device to cause a 3D object of the holographic object to be printed in response to the third user input.

10. The system of claim 7, wherein the user input is first user input, and wherein the at least one processor is further configured to execute the computer-executable instructions to:
   detect second user input indicative of one or more desired modifications to one or more attributes of the 3D holographic grid; and
   modify the one or more attributes of the 3D holographic grid based at least in part on the second user input, wherein the one or more attributes comprise at least one of a density of the 3D holographic grid or a scale of the 3D holographic grid.

11. The system of claim 7, wherein the at least one processor is configured to detect the user input indicative of the one or more design operations by executing the computer-executable instructions to receive sensor data from one or more sensors of a design object manipulated by a user.

12. The system of claim 7, wherein the user input is first user input, and wherein after generating the holographic object, the at least one processor is further configured to execute the computer-executable instructions to:
    detect second user input corresponding to a subset of the one or more cells; and
    remove one or more portions of the holographic object corresponding to the subset of the one or more cells to obtain a modified holographic object comprising a solid region and a hollow region.

13. A computer program product for generating a holographic object based on user commands, the computer program product comprising a non-transitory storage medium readable by a processing circuit, the storage medium storing instructions executable by the processing circuit to cause a method to be performed, the method comprising:
    controlling a first set of one or more holographic projectors to cause the first set of one or more projectors to project a three-dimensional (3D) holographic grid;
    detecting user input indicative of one or more design operations corresponding to one or more cells of the 3D holographic grid;
    generating the holographic object based at least in part on the user input; and
    controlling a second set of one or more holographic projectors to cause the second set of one or more holographic projectors to project the holographic object,
    wherein the user input indicative of one or more design operations corresponding to one or more cells of the 3D holographic grid comprises a first gesture of a user indicative of a first design operation corresponding to a first cell of the 3D holographic grid and a second gesture of the user indicative of a second design operation corresponding to a second cell of the 3D holographic grid, and
    wherein generating the holographic object based at least in part on the user input comprises generating a first portion of the holographic object at a first spatial location corresponding to the first cell of the 3D holographic grid in response to the first gesture and refraining from generating any portion of the holographic object at a second spatial location corresponding to the second cell of the 3D holographic grid in response to the second gesture.

14. The computer program product of claim 13, wherein the user input is first user input, the method further comprising:
    detecting second user input; and
    controlling the first set of one or more holographic projectors to cease projection of the 3D holographic grid in response to the second user input.

15. The computer program product of claim 13, wherein the user input is first user input, the method further comprising:
    detecting second user input indicative of one or more desired modifications to one or more attributes of the 3D holographic grid; and
    modifying the one or more attributes of the 3D holographic grid based at least in part on the second user input,
    wherein the one or more attributes comprise at least one of a density of the 3D holographic grid or a scale of the 3D holographic grid.

16. The computer program product of claim 13, wherein detecting the user input indicative of the one or more design operations comprises receiving sensor data from one or more sensors of a design object manipulated by a user.

17. The computer program product of claim 13, wherein the user input is first user input, the method further comprising after generating the holographic object:
    detecting second user input corresponding to a subset of the one or more cells; and
    removing one or more portions of the holographic object corresponding to the subset of the one or more cells to obtain a modified holographic object comprising a solid region and a hollow region.

* * * * *